United States Patent
Hung

(10) Patent No.: US 11,609,661 B2
(45) Date of Patent: Mar. 21, 2023

(54) TOUCH PANEL AND TOUCH INPUT SYSTEM

(71) Applicant: ILI Technology Corp., Hsinchu County (TW)

(72) Inventor: Chia-Yu Hung, Hsinchu County (TW)

(73) Assignee: ILI Technology Corp., Hsinchu County (TW)

(*) Notice: Subject to any disclaimer, the term of this patent is extended or adjusted under 35 U.S.C. 154(b) by 0 days.

(21) Appl. No.: 17/541,269

(22) Filed: Dec. 3, 2021

(65) Prior Publication Data

US 2023/0051460 A1 Feb. 16, 2023

(30) Foreign Application Priority Data

Aug. 5, 2021 (TW) .................................. 110209230

(51) Int. Cl.
| | |
|---|---|
| *G06F 3/041* | (2006.01) |
| *G06F 3/038* | (2013.01) |
| *G06F 3/0354* | (2013.01) |
| *H04W 72/21* | (2023.01) |

(52) U.S. Cl.
CPC ........ *G06F 3/04182* (2019.05); *G06F 3/0383* (2013.01); *G06F 3/03545* (2013.01); *G06F 3/04162* (2019.05); *G06F 3/04166* (2019.05); *H04W 72/21* (2023.01)

(58) Field of Classification Search
CPC ............. G06F 3/04182; G06F 3/03545; G06F 3/0383; G06F 3/04162; G06F 3/04166; H04W 72/0413
See application file for complete search history.

(56) References Cited

U.S. PATENT DOCUMENTS

| | | | |
|---|---|---|---|
| 9,448,646 B1* | 9/2016 | Fleck | .................... H04W 4/026 |
| 2012/0009877 A1 | 1/2012 | Zeinstra | |
| 2015/0034847 A1 | 2/2015 | Kotani | |
| 2016/0188007 A1 | 6/2016 | Jung | |
| 2017/0192591 A1 | 7/2017 | Jang | |
| 2018/0314356 A1* | 11/2018 | Chen | .................. G06F 3/03545 |
| 2021/0397297 A1* | 12/2021 | Ding | .................... G06F 3/0412 |
| 2022/0147160 A1* | 5/2022 | Das | ....................... G06F 3/0383 |

FOREIGN PATENT DOCUMENTS

| | | |
|---|---|---|
| CN | 109791445 A | 5/2019 |
| CN | 111448538 A | 7/2020 |
| TW | 201419104 A | 5/2014 |
| TW | 201807554 A | 3/2018 |

* cited by examiner

Primary Examiner — Jonathan A Boyd
(74) Attorney, Agent, or Firm — Winston Hsu

(57) ABSTRACT

A touch input system includes a touch panel, configured to transmit an uplink signal; and an active stylus, configured to analyze the uplink signal, synchronize timing and bi-directionally communicate with the touch panel according to the uplink signal; wherein the uplink signal includes a preamble, for synchronizing the timing; a digital data, for bi-directionally communicating between the active stylus and the touch panel; and a cyclic redundancy check, for executing an error check and an error correction for data.

12 Claims, 5 Drawing Sheets

FIG. 3

TOUCH PANEL AND TOUCH INPUT SYSTEM

BACKGROUND OF THE INVENTION

1. Field of the Invention

The present invention relates to a touch panel and a touch input system, and more particularly, to a touch panel and a touch input system that increases transmission capacity of uplink signals in limited time.

2. Description of the Prior Art

As technology advances, the touch sensing technology continuously improves, wherein using a stylus to directly input to a touch panel has become popular because such an operation imitates the procedure of using traditional writing tools and is easy to operate.

Currently, the methods of operating a capacitive touch panel with a stylus are roughly categorized to active touch sensing and passive touch sensing. The input method of the active touch sensing is tapping with an active stylus; however, the contact time of each tap is so short that the time for the touch panel and the active stylus to transmit uplink signals is extremely limited. In order to effectively shorten the occupancy time of the uplink signals, the prior art substantially reduces the data amount in the uplink signals, thus sacrificing the flexibility of the communication protocol. Or, in order to shorten the occupancy time of the uplink signals, the prior art may apply an additional communication device, such as a Bluetooth device, to transmit the data to be transmitted, which consequently increases a lot of costs. In such a situation, how to increase the transmission capacity of the uplink signals between the touch panel and the active stylus within a limited time has become one of the concerns in the industry.

SUMMARY OF THE INVENTION

Therefore, the present invention is to provide a touch panel and a touch input system for increasing a transmission capacity of uplink signals between the touch panel and an active stylus.

The present invention provides a touch panel, which comprises a memory; a transmission module; and a touch panel controller; wherein the touch panel controller controls the transmission module to transmit an uplink signal to synchronize timing and bi-directionally communicate with an active stylus, wherein the uplink signal comprises a preamble, stored in the memory to synchronize the timing; a digital data, for bi-directionally communicating between the active stylus and the touch panel; and a cyclic redundancy check, for executing an error check and an error correction for data.

The present invention provides a touch input system, which comprises a touch panel, configured to transmit an uplink signal; and an active stylus, configured to analyze the uplink signal, synchronize timing and bi-directionally communicate with the touch panel according to the uplink signal; wherein the uplink signal comprises a preamble, for synchronizing the timing; a digital data, for bi-directionally communicating between the active stylus and the touch panel; and a cyclic redundancy check, for executing an error check and an error correction for data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of an uplink signal transmitted with a maximum length sequence code according to the prior art.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to".

Figure 1:
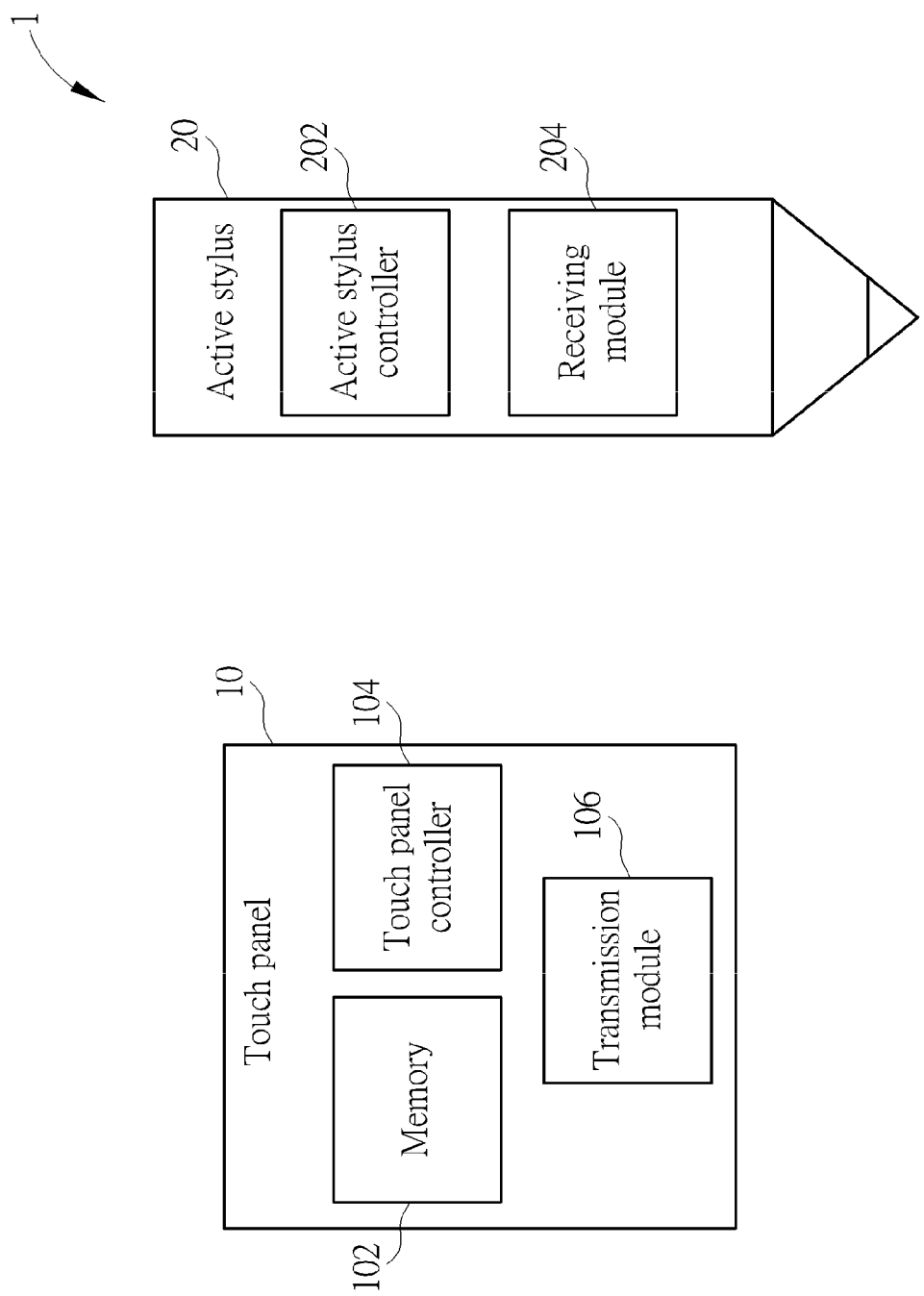
FIG. 1 is a schematic diagram of a touch input system according to an embodiment of the present invention.

Please refer to FIG. 1, which is a schematic diagram of a touch input system 1 according to an embodiment of the present invention. The touch input system 1 comprises a touch panel 10 and an active stylus 20. The touch panel 10 comprises a memory 102, a touch panel controller 104 and a transmission module 106. The active stylus 20 comprises an active stylus controller 202 and a receiving module 204. While the active stylus 20 contacts the touch panel 10, the touch panel 10 and the active stylus 20 establish a connection to synchronize timing and bi-directionally communicate. Note that, the touch input system 1 merely represents the necessary components to establish the connection to synchronize the timing, and the basic structure thereof is well known in the art, which will not be repeated.

Figure 2:
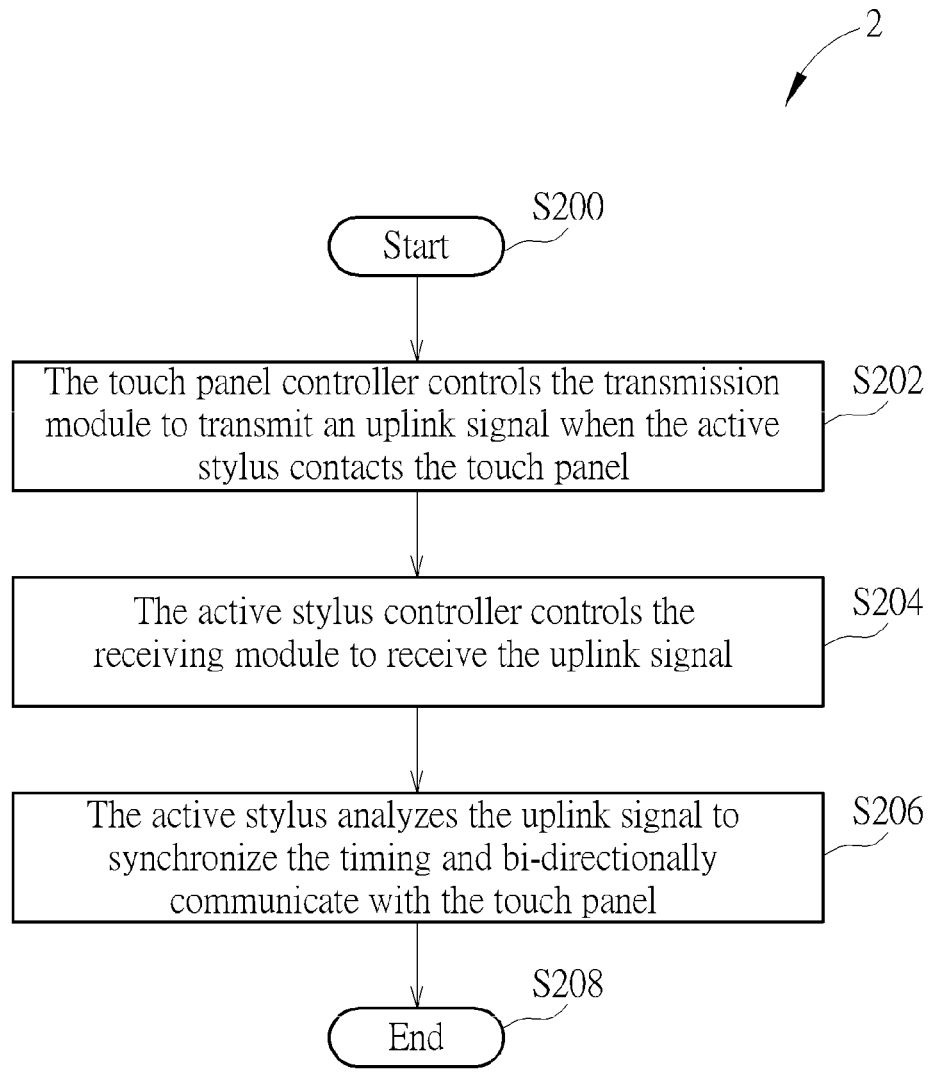
FIG. 2 is a flowchart of a connecting method between a touch panel and an active stylus according to an embodiment of the present invention.

The method of connecting the touch panel 10 and the active stylus 20 in the touch input system 1 can be summarized to a process 2 as shown in FIG. 2. The process 2 comprises the following steps:

Step S200: Start.

Step S202: The touch panel controller 104 controls the transmission module 106 to periodically transmit an uplink signal.

Step S204: The active stylus controller 202 controls the receiving module 204 to receive the uplink signal.

Step S206: The active stylus 20 analyzes the uplink signal to synchronize the timing and bi-directionally communicate with the touch panel 10.

Step S208: End.

According to the process 2, in Step S202, the touch panel controller 104 has to periodically transmit a synchronization signal, and then the active stylus 20 synchronizes the timing with the touch panel 10 according to the synchronization signal, so as to establish the connection between the touch panel 10 and the active stylus 20. Therefore, the touch panel controller 104 controls the transmission module 106 to transmit the uplink signal to the active stylus 20. The uplink signal comprises a preamble, a digital data, and a cyclic redundancy check (CRC). The preamble is a predetermined information stored in the memory 102 for synchronizing the timing; the digital data is utilized for bi-directional communication between the active stylus 20 and the touch panel 10; the CRC is utilized for executing an error check and an error correction for data. In detail, the uplink signal transmitted by the touch panel 10 is transmitted by a direct-sequence spread spectrum (DSSS) technology with a plurality of pseudo noise codes (PN codes). The pseudo noise codes may be maximum length sequence codes (MLS codes), Barker codes or nested Barker codes.

In Step S204, the active stylus controller 202 controls the receiving module 204 to receive the uplink signal. In Step S206, the active stylus 20 analyzes the uplink signal, and based on the preamble of the uplink signal, the active stylus 20 may synchronize the timing with the touch panel 10, so as to establish the connection between the active stylus 20 and the touch panel 10 and bi-directionally communicate.

Figure 3:
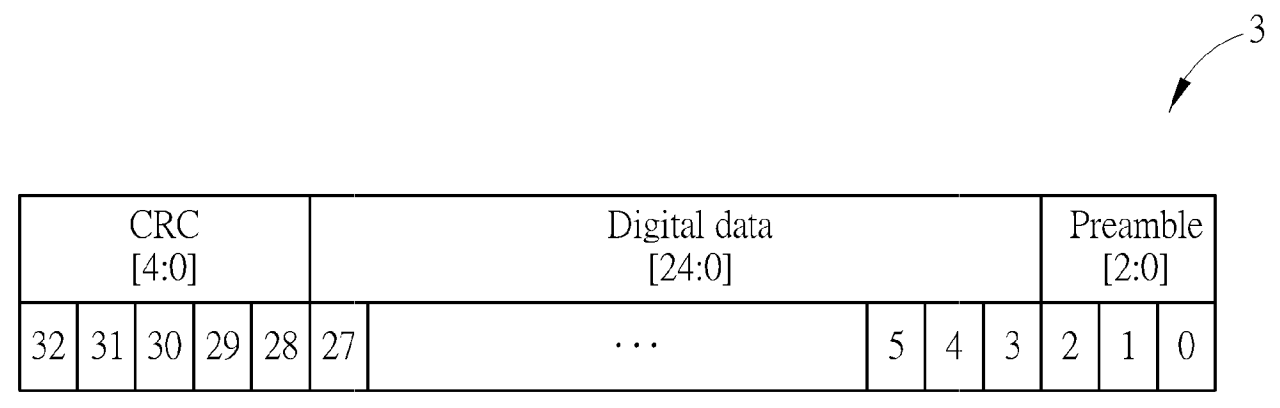

Please refer to FIG. 3, which is a schematic diagram of an uplink signal 3 transmitted with a maximum length sequence code according to the prior art. The preamble in the uplink signal 3 contains 3 bits of data, the digital data contains 25 bits of data, and the CRC contains 5 bits of data. That is, the uplink signal 3 contains 33 bits of data in total. Each bit of data in the uplink signal 3 is transmitted with a set of MLS codes composed of 31 chips. In general, each of the chips takes 1 microsecond (μs) to transmit, meaning that the set of MLS codes takes 31 microseconds to transmit. In this prior art, the uplink signal 3 containing 33-bit data takes 1023 microseconds (μs) to transmit. However, if the touch panel 10 is an in-cell touch panel, a display function and a touch function have to use a thin-film electrode of the in-cell touch panel in a time-divisional manner, such that a response time allocated to the touch function is very restricted. For example, the response time allocated to the touch function in an amorphous in-cell touch panel would be about 170 microseconds, and the response time allocated to the touch function in a LTPS in-cell touch panel would be about 250 microseconds. Nevertheless, the uplink signal 3 in the prior art takes 1023 microseconds, which exceeds the response time of 170-250 microseconds allocated to the touch function in the in-cell touch panel. That is to say, the uplink signal 3 in the prior art is not suitable for synchronizing the timing and bi-directionally communicating between the in-cell touch panel and the active stylus.

In order to improve the time-consuming issue of transmitting the uplink signal 3, the present invention modulates the plurality of bit data into a plurality of symbols, and transmits the plurality of symbols by the DSSS technology with a plurality of PN codes to solve the above issue.

Figure 4:
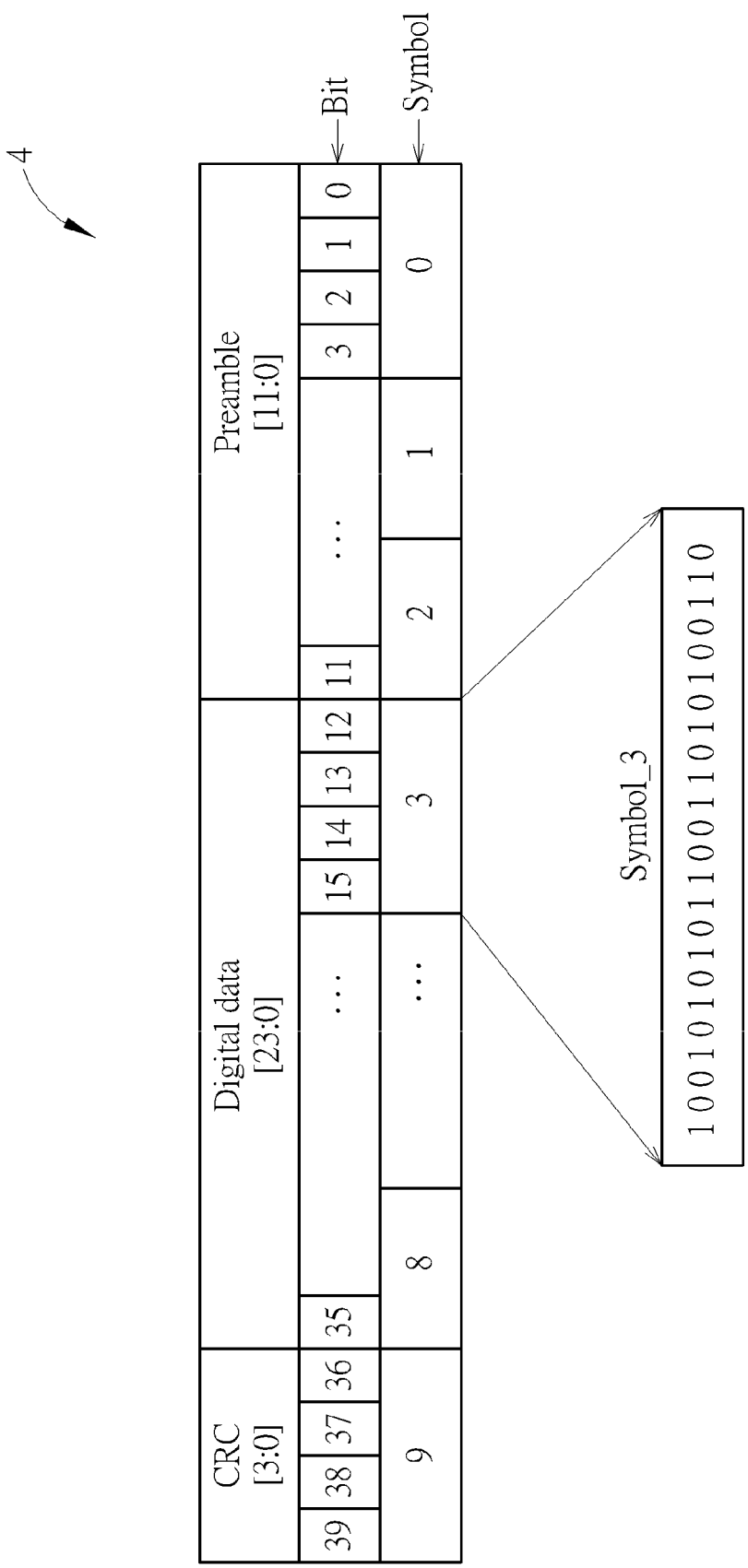
FIG. 4 is a schematic diagram of an uplink signal according to an embodiment of the present invention.

In detail, please refer to FIG. 4, which is a schematic diagram of an uplink signal 4 according to an embodiment of the present invention. The preamble in the uplink signal 4 contains 12 bits of data, the digital data contains 24 bits of data, and the CRC contains 4 bits of data. That is, the uplink signal 4 contains 40 bits of data in total. Specifically, the touch panel controller 104 modulates the 12-bit data of the preamble into 3 symbols, the 24-bit data of the digital data into 6 symbols, and the 4-bit data of the CRC into 1 symbol. In other words, the touch panel controller 104 modulates every 4-bit data into 1 symbol. Then, the touch panel controller 104 transmits the 10 symbols by the DSSS technology with 10 PN codes. More specifically, each of the symbols in the uplink signal 4 is transmitted by a set of the MLS codes composed of 24 chips. For example, a symbol Symbol_3 is {1, −1, −1, 1, −1, 1, −1, 1, −1, 1, 1, −1, −1, 1, 1, −1, 1, −1, 1, −1, −1, 1, 1, −1}. In general, each chip takes 1 microsecond to transmit, which means that the set of MLS codes takes 24 microseconds to transmit. In this embodiment, the uplink signal 4 composed of 10 symbols will take 240 microseconds to transmit. Therefore, if the touch panel 10 is the LTPS in-cell touch panel, the response time allocated to the touch function is about 250 microseconds, which means that the response time for the touch panel controller 104 to modulate and transmit the uplink signal 4 is less than 250 microseconds in this embodiment, which overcomes the issue of long response time in the prior art.

For example, please refer to Table 1 below, which is a set of MLS codes for transmitting a symbol according to an embodiment of the present invention, wherein every symbol represents 4 bits of data. The first column of Table 1, {Data_0, Data_1 . . . , Data_F}, is the representation of the 4-bit data, and the second column is the MLS codes corresponding to the 4-bit data.

TABLE 1

| Data_0 | 0x65AA56 |
|---|---|
| Data_1 | 0x569A99 |
| Data_2 | 0x9A9956 |
| Data_3 | 0x6695A6 |
| Data_4 | 0xA59969 |
| Data_5 | 0x59966A |
| Data_6 | 0x96A665 |
| Data_7 | 0xA99695 |
| Data_8 | 0x9A55A9 |
| Data_9 | 0xA96566 |
| Data_A | 0x6566A9 |
| Data_B | 0x966A59 |
| Data_C | 0x5A6696 |
| Data_D | 0xA66995 |
| Data_E | 0x69599A |
| Data_F | 0x56696A |

Figure 5:
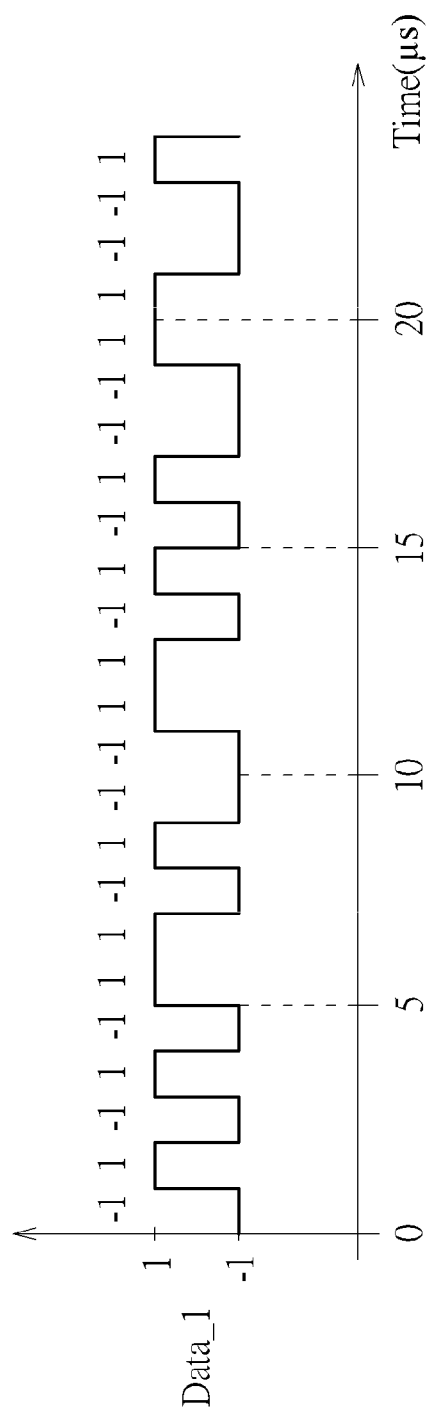
FIG. 5 is a schematic diagram of a waveform of a maximum length sequence code according to an embodiment of the present invention.

In detail, for example, the MLS code of 0x569A99 corresponding to Data_1 is a shorthand or brief for {−1, 1, −1, 1, −1, 1, 1, −1, 1, −1, −1, 1, 1, −1, 1, −1, 1, −1, −1, 1, 1, −1, −1, 1}, where each number represents a chip, −1 represents low potential and 1 represents high potential. The waveform of Data_1 is shown in FIG. 5.

In one embodiment, the plurality of symbols of the present invention has a low correlation, a zero correlation, or a negative correlation with each other. In detail, symbols of a first half of the plurality of symbols, namely Data_0, Data_1, . . . , Data_7, are low correlated with each other. For example, the MLS code of 0x65AA56 corresponding to the symbol Data_0 is {−1, 1, 1, −1, −1, 1, −1, 1, 1, −1, 1, −1, 1, −1, 1, −1, −1, 1, −1, 1, −1, 1, 1, −1}, the MLS code of 0x569A99 corresponding to the symbol Data_1 is {−1, 1, −1, 1, −1, 1, 1, −1, 1, −1, −1, 1, 1, −1, 1, −1, 1, −1, −1, 1, 1, −1, −1, 1}, an inner product of the symbol Data_0 and the symbol Data_1 is {1, 1, −1, −1, 1, 1, −1, −1, 1, 1, −1, −1, 1, 1, 1, −1, −1, 1, 1, −1, −1, −1, −1}, and the sum of each number of the inner product {1, 1, −1, −1, 1, 1, −1, −1, 1, 1, −1, −1, 1, 1, 1, 1, −1, −1, 1, 1, −1, −1, −1, −1} is 0; therefore, the symbol Data_0 and the symbol Data_1 have a zero correlation. In the same way, symbols of a second half of the plurality of symbols, namely Data_8, Data_9, . . . , Data_F, are also low correlated with each other. Note that, the plurality of symbols may also be highly negatively correlated with each other. In detail, the symbols of the first half of the plurality of symbols are highly negatively correlated with the symbols of the second half of the plurality of symbols. For example, the MLS code of 0x9A55A9 corresponding to the symbol Data_8 is {1, −1, −1, 1, 1, −1, 1, −1, −1, 1, −1, 1, −1, 1, −1, 1, 1, −1, 1, −1, 1, −1, −1, 1}, an inner product of the symbol Data_0 and the symbol Data_8 is {−1, −1, −1, −1, −1, −1, −1, −1, −1, −1, −1, −1, −1, −1, −1, −1, −1, −1, −1, −1, −1, −1, −1, −1}, and the sum of each number of the inner product {−1, −1, −1, −1, −1, −1, −1, −1, −1, −1, −1, −1, −1, −1, −1, −1, −1, −1, −1, −1, −1, −1, −1, −1} is −24; therefore, the symbol Data_0 and the symbol Data_8 are highly negatively correlated with each other.

In another embodiment of the present invention, please refer to Table 2 below. The preamble in an uplink signal 5 contains 12 bits of data, the digital data contains 12 bits of data, and the CRC contains 4 bits of data. That is, the uplink signal 5 contains 28 bits of data in total. In detail, the touch panel controller 104 modulates the 12-bit data of the preamble into 3 symbols, the 12-bit data of the digital data into 3 symbols, and the 4-bit data of the CRC into 1 symbol. In other words, the touch panel controller 104 modulates every 4-bit data into 1 symbol. Then, the touch panel controller 104 transmits the 7 symbols by the DSSS technology with 7 PN codes. More specifically, each of the symbols in the uplink signal 5 is transmitted by a set of MLS codes composed of 22 chips. In general, each chip takes 1 microsecond to transmit, which means that the set of MLS codes takes 22 microseconds to transmit. In this embodiment, the uplink signal 5 composed of 7 symbols will take 154 microseconds to transmit. Therefore, if the touch panel 10 is the amorphous in-cell touch panel, the response time allocated to the touch function is about 170 microseconds, which means that the response time for the touch panel controller 104 to modulate and transmit the uplink signal 5 is less than 170 microseconds in this embodiment, which overcomes the issue of long response time in the prior art.

TABLE 2

|  | Uplink signal 4 | Uplink signal 5 | Uplink signal 6 |
| --- | --- | --- | --- |
| Time spent of each chip (μs) | 1 | 1 | 1 |
| Chip amount of each symbol (preamble) | 24 | 22 | 32 |
| Bit amount of each symbol (preamble) | 4 | 4 | 4 |
| Ratio of a chip amount to a bit amount of each symbol (preamble) | 6 | 5.5 | 8 |
| Chip amount of each symbol (digital data and CRC) | 24 | 22 | 30 |
| Bit amount of each symbol (digital data and CRC) | 4 | 4 | 4 |
| Ratio of a chip amount to a bit amount of each symbol (digital data and CRC) | 6 | 5.5 | 7.5 |
| Symbol amount of an uplink signal | 10 | 7 | 8 |
| Symbol amount of a preamble | 3 | 3 | 3 |
| Symbol amount of a digital data | 6 | 3 | 4 |
| Symbol amount of a CRC | 1 | 1 | 1 |
| Bit amount of a preamble | 12 | 12 | 12 |
| Bit amount of a digital data | 24 | 12 | 16 |
| Bit amount of a CRC | 4 | 4 | 4 |
| Response time for a preamble (μs) | 72 | 66 | 96 |
| Response time for a digital data (μs) | 144 | 66 | 120 |
| Response time for a cyclic redundancy check (μs) | 24 | 22 | 30 |
| Response time for an uplink signal (μs) | 240 | 154 | 246 |

In another embodiment of the present invention, please refer to Table 2. The preamble in an uplink signal 6 contains 12 bits of data, the digital data contains 16 bits of data, and the CRC contains 4 bits of data. That is, the uplink signal 6 contains 32 bits of data in total. In detail, the touch panel controller 104 modulates the 12-bit data of the preamble into 3 symbols, the 16-bit data of the digital data into 4 symbols, and the 4-bit data of the CRC into 1 symbol. In other words, the touch panel controller 104 modulates every 4-bit data into 1 symbol. Then, the touch panel controller 104 transmits the 4 symbols of the digital data and the 1 symbol of the CRC by the DSSS technology with 5 PN codes composed of 30 chips, and transmits the 3 symbols of the preamble with 3 PN codes composed of 32 chips. In general, each chip takes 1 microsecond to transmit, which means that the uplink signal 6 composed of 8 symbols will take 246 microseconds to transmit in this embodiment. Therefore, if the touch panel 10 is the LTPS in-cell touch panel, the response time allocated to the touch function is about 246 microseconds, which means that the response time for the touch panel controller 104 to modulate and transmit the uplink signal 6 is less than 250 microseconds in this embodiment, which overcomes the issue of long response time in the prior art.

Moreover, please refer to Table 2, the uplink signal in the present invention is composed of the plurality of chips, which may be divided into the plurality of symbols, and each symbol contains the plurality of bits. In the uplink signal, a value of a ratio of a chip amount included in each symbol of the preamble to an amount of bits included in each symbol of the preamble is not greater than 12, and a value of a ratio of a chip amount included in each symbol of the digital data and the CRC to an amount of bits included in the digital data and the CRC is not greater than 12.

Note that, the touch input system 1 is the embodiment of the present invention, and those skilled in the art may readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM) and the touch input system 1. The memory 102 may be a computer-readable storage medium, and the memory 102 may include read-only memory (ROM), flash memory, random access memory (RAM), subscriber identity module (SIM), hard disk, floppy diskette, or CD-ROM/DVD-ROM/BD-ROM, but not limited thereto. The procedures and examples above may be compiled into program codes or instructions and stored in the memory 102. The touch panel controller 104 may read and execute the program codes or the instructions stored in the memory 102 for realizing the abovementioned functions.

In summary, compared to the prior art where the uplink signal takes 1023 microseconds, which exceeds the response time of 170-250 microseconds allocated to the touch function in the in-cell touch panel, the touch panel controller of the present invention modulates the plurality of bit data of the uplink signal into the plurality of symbols, and transmits the uplink signal by the DSSS technology with the PN codes composed of the plurality of chips, so that the response time to transmit the uplink signal in the present invention is less than 170-250 microseconds, thus overcoming the issue of long response time in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
a memory;
a transmission module; and
a touch panel controller;
wherein the touch panel controller controls the transmission module to transmit an uplink signal to synchronize timing and bi-directionally communicate with an active stylus, wherein the uplink signal comprises:
a preamble, stored in the memory to synchronize the timing;
a digital data, for bi-directionally communicating between the active stylus and the touch panel; and
a cyclic redundancy check, for executing an error check and an error correction for data;
wherein the uplink signal comprises a plurality of bit data, each of the plurality of bit data comprises at least four bits of data, the preamble comprises at least two bits of data, the digital data comprises at least one bit of data, and the cyclic redundancy check comprises at least one bit of data;
wherein the touch panel is an in-cell touch panel;
wherein the plurality of bit data of the uplink signal are modulated into a plurality of symbols to be transmitted by a direct-sequence spread spectrum (DSSS) technology with a plurality of pseudo noise codes.

2. The touch panel of claim 1, wherein a value of a ratio of an amount of chips included in each symbol of the preamble to an amount of bits included in each symbol of the preamble is not greater than 12.

3. The touch panel of claim 1, wherein a value of a ratio of an amount of chips included in each symbol of the digital data and the cyclic redundancy check to an amount of bits included in the digital data and the cyclic redundancy check is not greater than 12.

4. The touch panel of claim 1, wherein a plurality of symbols of bits of data of the preamble have a low correlation with a plurality of symbols of bits of data of the digital data.

5. The touch panel of claim 1, wherein symbols of bits of data of a first half of a plurality of symbols of the digital data are low correlated with each other, symbols of bits of data of a second half of the digital data are low correlated with each other, and the symbols of bits of data of the first half of the digital data are highly correlated with the symbols of bits of data of the second half of the digital data.

6. The touch panel of claim 1, wherein the plurality of pseudo noise codes are Barker codes or nested Barker codes.

7. A touch input system, comprising:
a touch panel, configured to transmit an uplink signal; and
an active stylus, configured to analyze the uplink signal, synchronize timing and bi-directionally communicate with the touch panel according to the uplink signal;
wherein the uplink signal comprises:
a preamble, for synchronizing the timing;
a digital data, for bi-directionally communicating between the active stylus and the touch panel; and
a cyclic redundancy check, for executing an error check and an error correction for data;
wherein the uplink signal comprises a plurality of bit data, each of the plurality of bit data comprises at least four bits of data, the preamble comprises at least two bits of data, the digital data comprises at least one bit of data, and the cyclic redundancy check comprises at least one bit of data;
wherein the touch panel is an in-cell touch panel;
wherein the plurality of bit data of the uplink signal are modulated into a plurality of symbols to be transmitted by a direct-sequence spread spectrum (DSSS) technology with a plurality of pseudo noise codes.

8. The touch input system of claim 7, wherein a value of a ratio of an amount of chips included in each symbol of the preamble to an amount of bits included in each symbol of the preamble is not greater than 12.

9. The touch input system of claim 7, wherein a value of a ratio of an amount of chips included in each symbol of the digital data and the cyclic redundancy check to an amount of bits included in the digital data and the cyclic redundancy check is not greater than 12.

10. The touch input system of claim 7, wherein a plurality of symbols of bits of data of the preamble have a low correlation with a plurality of the symbols of bits of data of the digital data.

11. The touch input system of claim 7, wherein symbols of bits of data of a first half of a plurality of symbols of the digital data are low correlated with each other, symbols of bits of data of a second half of the digital data are low correlated with each other, and the symbols of bits of data of the first half of the digital data are highly correlated with the symbols of bits of data of the second half of the digital data.

12. The touch input system of claim 7, wherein the plurality of pseudo noise codes are Barker codes or nested Barker codes.

* * * * *